April 20, 1948.  H. R. F. CARSTEN ET AL  2,439,841
COUPLING FOR CO-AXIAL CABLES
Filed Aug. 18, 1944
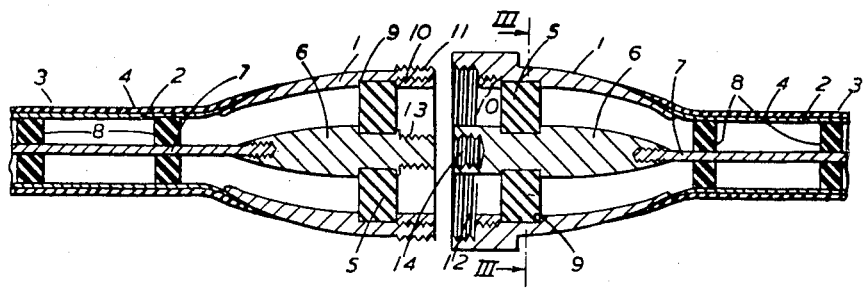
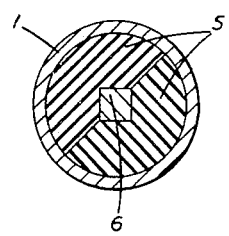
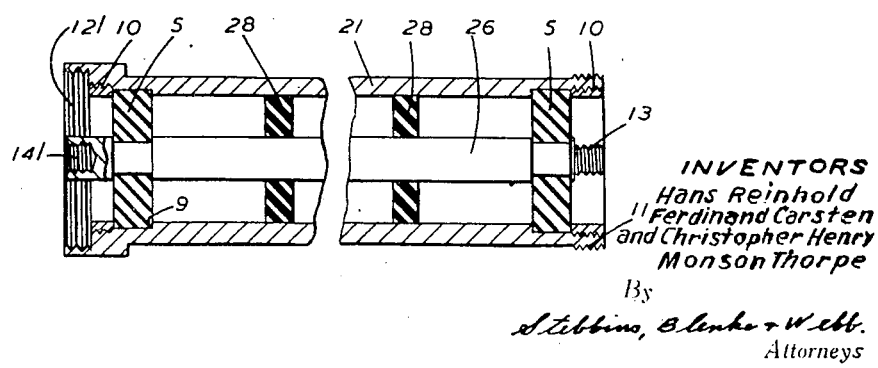
INVENTORS
Hans Reinhold
Ferdinand Carsten
and Christopher Henry
Monson Thorpe
By
Stebbins, Blenko & Webb.
Attorneys Patented Apr. 20, 1948

2,439,841

UNITED STATES PATENT OFFICE 2,439,841

COUPLING FOR COAXIAL CABLES

Hans Reinhold Ferdinand Carsten, Liverpool, and Christopher Henry Monson Thorpe, Huyton, England, assignors, by mesne assignments, to British Insulated Callender's Cables Limited, London, England, a company of Great Britain Application August 18, 1944, Serial No. 550,028
In Great Britain September 28, 1943

2 Claims. (Cl. 174—21)

This invention relates to couplings for coaxial conductor cables, either for the purpose of effecting a sound, but readily detachable, mechanical and electrical connection between two lengths of cable, or between a cable and some electrical apparatus.

In accordance with the present invention, in a two-part coupling comprising two coaxial pairs of interengaging contacts, each part of the coupling comprising two relatively fixed contacts, one of each pair, each pair of contacts consists of an internally screw-threaded socket member and an externally screw-threaded plug member adapted to screw into the socket member and the screw threads on the members forming one pair are of the same hand as, but of slightly different pitch from, those on the members forming the other pair so that after the respective plugs and sockets have been brought into engagement by a few turns of the one coupling part relative to the other, the contact members of each pair become locked together.

The screw threads on the contacts of each coupling part preferably start in the same relative position so that the threads on the inner plug and socket contacts begin to screw up simultaneously with those on the outer plug and socket contacts. If they do not start in the same relative position, the angular displacement between the starts of the threads on the two contacts of one coupling part should correspond to that between the starts of the screw threads on the contacts of the other coupling part, so that when making the coupling, screwing up of both plugs in their respective sockets, even though not commenced simultaneously, is possible and can proceed concurrently until the two sets of threads become locked owing to their different pitches. The pitches of the inner and outer pairs of screw threads are so chosen that the two parts of the coupling may be given a predetermined number of turns, one relative to the other, before the play between the pairs of interengaging threads is taken up and the coupling becomes tight. In this condition, the leading flanks of the threads of one pair of contacts will be pressed together and the trailing flanks of the threads of the other pair of contacts will be pressed together. This will result in good electrical contact between and a mechanical locking of, the contacts of each pair. The only effect of wear on the threads will be to allow the mating parts to screw up a little further before becoming tight. Whether the leading flanks of the outer pair or of the inner pair will be pressed together will, of course, depend on whether the pitch of the threads of the outer pair is smaller or greater than that of the threads of the inner pair. Where it is desired that the outer conductor or screen, rather than the inner conductor shall take the pull on the cable, the pitch of the threads of the outer pair will be the greater so that the trailing flanks of these threads are pressed together.

Where the coupling parts are secured one on each of two lengths of cable to be connected together, the necessity for rotating the parts or one of them to make or break the coupling may be a disadvantage—especially where long lengths of cable are concerned. This may be overcome by the use between the two lengths of a short connecting piece of which one end forms or carries a coupling part adapted to engage a complementary coupling part on the one cable length and of which the other end forms or carries a coupling part adapted to engage a complementary coupling part on the other cable length having screw-threaded contacts of the same pitches, but of opposite hands, to those of the corresponding contacts of the coupling part of the first length. By rotating this connecting piece in the appropriate direction, the two cables can be simultaneously coupled to the ends of the connecting piece and so electrically and mechanically connected together. It may happen, of course, that owing to inaccuracy of manufacture or uneven wear that the threads of one coupling will lock before those of the other. This is not a serious disadvantage, for a further fraction of a turn of the two parts of the other coupling should suffice to lock them also, and it will usually be possible to impart such further relative movement by slightly twisting one or other of the cable lengths.

To enable the invention to be more fully understood, examples of cable couplings constructed in accordance with the invention will now be described with the aid of the accompanying drawings wherein—

Figure 1 is a longitudinal section of an end of a cable length carrying the plug part of a two-part coupling, Figure 2 is a longitudinal section of an end of a second cable length carrying the socket part of a two-part coupling, Figure 3 is a cross-section on the line III—III of Figure 2, and Figure 4 is a longitudinal section of a connecting piece of a three-part coupling.

Referring firstly to Figures 1, 2 and 3 only, it will be seen that the parts of the two-part coupling for connecting together the ends of two lengths of coaxial cable, each comprise an outer tubular member 1 of conoidal form. This is of brass or other suitable metal. The smaller end of the member approximates in diameter and wall thickness to the internal diameter and wall thickness of the outer conductor 2 of the cable 3, so that the member 1 forms a smooth continuation of gradually increasing cross-section of the outer conductor to which it is connected by soldering. The cable sheath 4 overlaps the end of the tubular member 1 and if of rubber, rubber wax or a synthetic plastic is a tight fit thereon, or if it is a thin lead sheath it is anchored thereto by a wiped metal joint. Centrally supported within the tubular member 1 on a support 5 of low loss insulating material is a metal rod, of which the inner end has a central screw-threaded hole to receive the screw-threaded end of the central cable conductor 7 which is supported on insulating supports 8. Between the support 5 and its inner end, the rod 6 gradually diminishes in diameter until at that end its diameter approximates to that of the central conductor to which it is connected. Relative movement in both rotary and axial directions between the rod 6 and the tubular member 1 shrouding it is prevented by the support 5. At its point of support the rod is of reduced section, being square, and the support disc 5, which is split diametrically and has a central aperture of corresponding shape, as shown in Figure 3, is gripped between an annular seating 9 and a tube nut 10 screwed in the open end of the tubular member 1.

On the external surface of the open end of the conoidal tubular member shown in Figure 1 is a screw thread 11 and on the front end of the central rod 6 which it supports, is an external screw thread 13. These two parts thus respectively constitute outer and inner concentric externally screw-threaded plug members. The open end of the tubular member 2 shown in Figure 2 is enlarged and internally screw-threaded at 12 and the front end of its central rod 6 has a recess provided with an internal screw thread 14. These two parts respectively constitute outer and inner concentric, internally screw-threaded socket members to receive respectively, the outer and the inner of the externally screw-threaded plug members. It will be apparent that the threads on the plug and socket members will all be of the same hand. In accordance with the invention, however, the threads on the outer of the two coaxial pairs of contacts differ slightly in pitch from those on the inner of the two pairs. The pitches of the screw threads will depend to some extent on the diameter of the parts of the coupling. For a coupling having a central conductor rod 6 of 0.75 inch diameter and a tubular member with a maximum internal diameter of 2.0 inches, the pitch of the threads on the central rods may be 0.125 inch and that of the threads on the conoidal tubular members 0.129 inch. The lengths of the threaded portions may be of the order of ⅝ inch.

In the arrangement described above both plug members are located in the same part of the coupling, but it will be apparent that this arrangement is not essential.

In Figure 4 there is shown a short connecting piece comprising a cylindrical metal tube 21 in which is a central conductor 26 supported by insulating spacers 28. Relative movement between the conductor 26 and the tube 21 is prevented by the clamped end supports 5 in the same way as such movement is prevented between the parts 6 and 1 of the plug and socket parts shown in Figures 1 and 2, respectively. The ends of the conductor 26 and of the tube 21 are screw-threaded, externally at one end and internally at the other, as are the ends of the parts shown in Figures 1 and 2, except that the internal threads of the connecting piece are of opposite hand to the external threads. Such a connecting piece is intended to be used to couple together plug and socket parts on the ends of two cable lengths without having to twist one or both cable lengths to do so. To this end the screw threads of the plug part will be of the same hand as those of the socket end of the connecting piece and those of the socket part of the same hand as those of the plug end of the connecting piece and the pitch of the inner threads will differ slightly from that of the outer threads to ensure that all parts of the coupling become locked together. In some cases with the object of avoiding mechanical damage to the screw threads, it may be preferable to provide one end of each cable length with a socket part of the form shown in Figure 2 and the other end with a socket part of similar form but having threads of opposite hand, and to provide external threads of opposite hands on the connecting piece.

What we claim as our invention is:

1. A coupling for a coaxial conductor cable comprising two coaxial pairs of interengaging contacts, an inner pair and an outer pair, said coupling being in two parts each of which comprises two relatively fixed contacts, one of each pair, each of said pair of contacts consisting of an internally screw-threaded socket member and an externally screw-threaded plug member for screwing into said socket member, the screw threads on the members forming the inner pair of contacts being of the same hand as, but of slightly different pitch from, the screw threads on the members forming the outer pair of contacts, whereby after the respective plugs and sockets have been brought into engagement by a few turns of the one coupling part relative to the other coupling part, the contact members of each of said pairs become locked together.

2. Means for effecting a plug and socket coupling between two lengths of coaxial conductor cable, comprising in combination with a coupling part on each cable length having concentrically disposed contact members, a connecting piece having, at one end thereof, two concentrically disposed contact members for making with the contact members of the one coupling part a concentric pair of screw-threaded plug and socket connections and having, at the other end, concentrically disposed contact members for making with the contact members of the other coupling part a second concentric pair of screw-threaded plug and socket connections, the screw threads of one pair of said connections being of opposite hand to the screw threads of the other pair of connections, and the screw threads of the outer connections of both pairs being all of the same pitch and the screw threads of the inner connections of both pairs being all of a pitch that is slightly different from the pitch of the threads of the outer connections.

HANS REINHOLD FERDINAND CARSTEN.
CHRISTOPHER HENRY MONSON THORPE.

REFERENCES CITED

The following references are of record in the file of this patent:

UNITED STATES PATENTS

| Number | Name | Date |
| --- | --- | --- |
| 173,239 | Rice | Feb. 8, 1876 |
| 173,963 | Johnson | Feb. 22, 1876 |
| 477,951 | Mezger | June 8, 1892 |
| 1,242,066 | Starr | Oct. 2, 1917 |
| 1,958,747 | Fiege | May 15, 1934 |